AUTOMATIC SWITCH

Filed June 3, 1947 2 SHEETS—SHEET 1

INVENTORS.
ERIC WYN JONES
OWEN AVIS PEARCE
BY
Chas. Fw. Candy
ATTORNEY

AUTOMATIC SWITCH

Filed June 3, 1947 2 SHEETS—SHEET 2

INVENTORS.
ERIC WYN JONES
OWEN AVIS PEARCE
BY
ATTORNEY

Patented Dec. 11, 1951 2,578,071

UNITED STATES PATENT OFFICE 2,578,071

AUTOMATIC SWITCH

Eric Wyn Jones and Owen Avis Pearce, Liverpool, England, assignors to Automatic Telephone & Electric Company Limited, Liverpool, England, a British company Application June 3, 1947, Serial No. 752,212
In Great Britain June 7, 1946

10 Claims. (Cl. 179—18)

Figure 1:
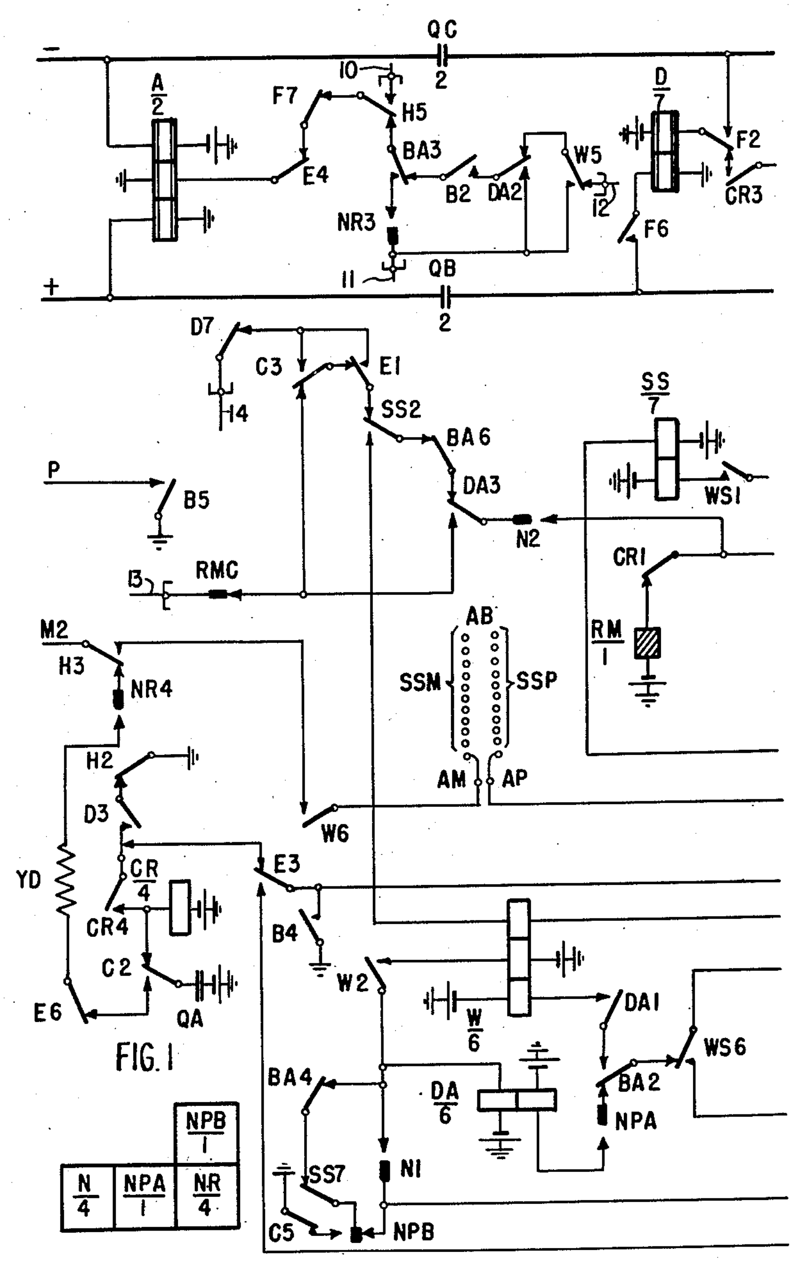

The present invention relates to automatic switches of the type used in telephone systems and is more particularly concerned with two-motion switches having so-called rectangular release.

Frequently automatic switches are arranged to have access to a plurality of groups of trunks and in certain circumstances it is then necessary to provide the switch with arrangements whereby it responds to three trains of impulses, of which the first serves to determine which group of lines is required and the second and third serve to set the switch on to a desired line of the group. One method of effecting this is to cause the switch to respond to and register the first train and then release whereupon the switch again responds to the second and third trains to select the desired line in the selected group.

However, it is found with a digit-absorbing switch of this type that under abnormal conditions the restoration to normal of the switch wipers to effect digit absorption is not sufficiently rapid to be completed within the inter-digital pause with the result that one or more of the impulses in the second train is lost and a wrong connection occurs.

It is one of the objects of the present invention to provide an automatic switch which does not suffer from this disadvantage. A further object of the invention is to provide arrangements for increasing the outlet capacity of the switch.

According to one feature of the invention, certain impulses of the first train serve to set the switch while the remaining impulses cause circuit changes to take place which enable a selection amongst the groups of trunks to be effected, the switch restoring to normal during the reception of the remaining impulses.

According to a further feature of the invention, in response to a variable first train of impulses, the wipers of the switch are restored to normal on attaining a level prior to that corresponding to any of the prefix digits, the remaining impulse or impulses in said first train being registered to enable a selection amongst the groups of trunks to be effected.

According to another feature of the invention the switch is adapted to respond to a predetermined number of impulses in the first train independent of the total number of impulses in the train and then to restore to normal, the remaining impulses in the train serving to determine whether a connection is to be set up to another subscriber over alternative banks or whether a special service circuit is to be taken into use over an auxiliary bank.

According to yet another feature of the invention, the outlet capacity of the switch is increased by the provision of an auxiliary bank whereby all the contacts in the normal banks are available for speaking connections while special service circuits are accessible over the auxiliary bank as determined by a prefix digit transmitted to the switch.

Preferably the auxiliary bank is of the type embodied in the automatic switch disclosed in United States Patent No. 2,028,689 issued January 21, 1936, to R. N. Saxby and the special service circuits may be, for example, fire alarm, tie-line and watchman service circuits.

Figure 2:
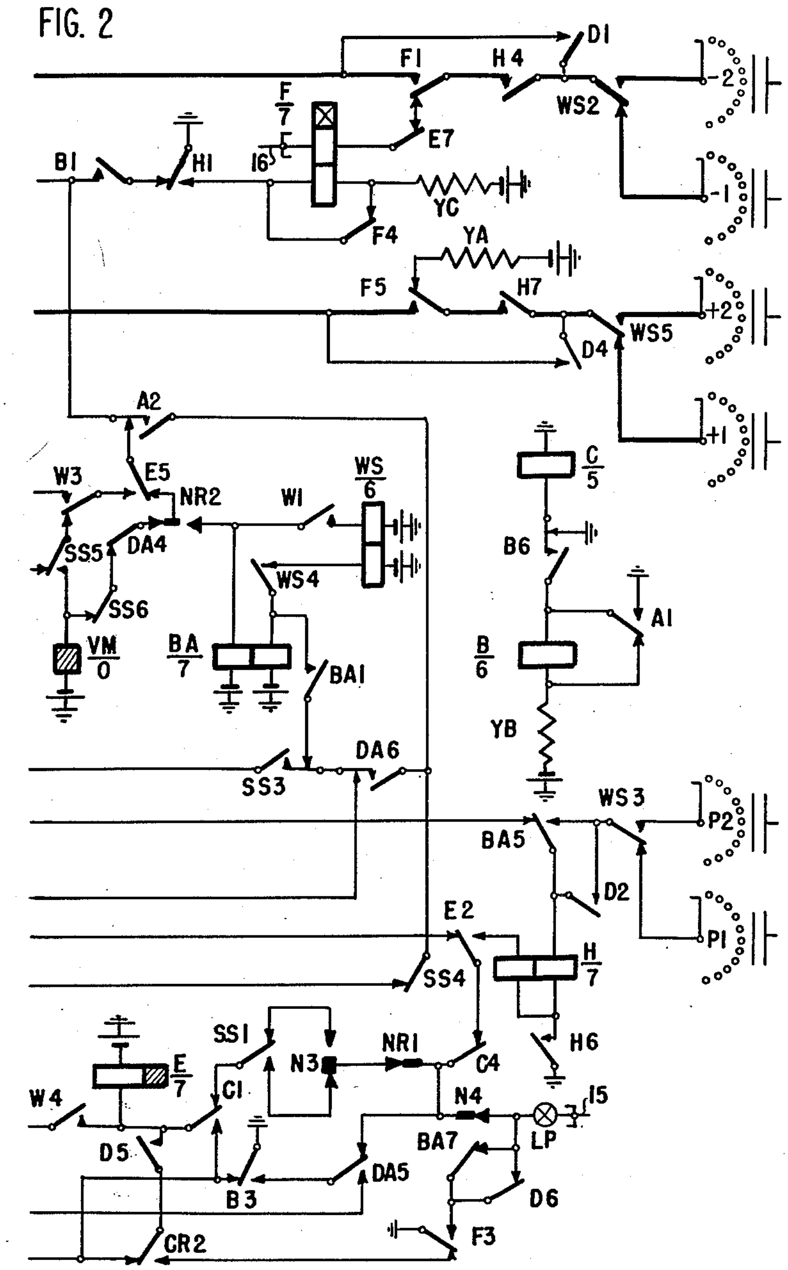

The invention will be better understood from the following description of one embodiment taken in conjunction with the accompanying drawings comprising Figs. 1 and 2 which should be placed side by side with Fig. 1 on the left, and which show its application to a P. A. X final selector switch providing, as a maximum, access to any one of two hundred subscribers' lines and ten special service trunks.

Now the level over which the wipers release to normal during dialling of the first impulse train or prefix digit is that on which the cam operated normal-post contacts NPA are pre-set to operate, and this may be any level from 1 to 7 inclusive, but to provide a customary numbering scheme for private automatic exchanges, level 1 is to be preferred. In this case the numbering scheme is:

200–299, 1st hundred line group.
300–399, 2nd hundred line group.
40–49, 10 special service trunks.

Considering the operation of the selector in detail, when the selector is seized, relay A operates over the loop, applied to the negative and positive leads, by way of its outer windings, and thereupon at contacts A1 operates relay B in series with resistor YB, and at contacts A2 opens a point in the vertical magnet circuit VM and prepares the digit absorption and impulse counting circuits. Relay B operating, at contacts B1 prepares the vertical magnet, digit absorption and impulse counting circuits, at contacts B2 connects dial tone earth, extending over common lead 12, to the middle winding of relay A, at contacts B3 completes a circuit to light the supervisory lamp LP to battery via the delayed alarm equipment extending over common lead 15, and at contacts B5 connects guarding earth to the incoming P lead.

It will be noted that with dial tone earth connected to the middle winding of relay A, this relay now serves as a tone transformer so that dial tone is audible to the calling party.

Let us first assume that the calling party requires connection to a party in the 1st hundred line group. Upon dialling the hundreds digit "2" relay A responds in known manner by releasing twice. On the first release a circuit is completed at contacts A1 to operate relay C in series with resistor YB, and the vertical magnet is energised at contacts A2 to raise the wipers to level 1, whereupon the normal post contacts NPA operate to prepare an operate circuit for relay DA. Relay C in operating, at contacts C3 prepares to connect battery from the rotary magnet RM to common lead 14 extending to the release control earth. As soon as the switch moves off-normal the vertical off-normal contacts operate and at contacts N1 prepare a hold circuit for relay DA, at contacts N2 close a point in the rotary magnet circuit, and at contacts N4 disconnect the supervisory lamp circuit.

The operated contacts C3 and N2 extend battery from the rotary magnet to common lead 14 extending to the release control earth in the supervisory circuit, whereupon a relay arrangement applies a low resistance release alarm earth to common lead 13 for a period sufficient to cover the release time of the switch.

Meantime, on the first "make" of the dial, relay A re-operates to disconnect the vertical magnet at contacts A2 and to operate relay DA on its right-hand winding from earth over contacts H1, B1, A2, SS4, WS6, BA2 and NPA. Relay DA in operating, at contacts DA1 prepares an operating circuit for relay W, at contacts DA2 opens a point in the dial tone earth lead, at contacts DA3 completes a circuit to the rotary magnet over the rotary magnet interrupter contacts RMC to the before-mentioned low resistance release alarm earth on common lead 13, at contacts DA4 opens the impulsing circuit to the vertical magnet VM so that the vertical movement is terminated, at contacts DA5 extends earth from contacts B3 to hold itself on the left hand winding over operated contacts N1, at contacts DA6 prepares a hold circuit for relay BA. It will be apparent that immediately relay DA operates, that is with the wipers at level 1, the wipers advance into the bank and proceed to release. During the first rotary step the rotary off-normal contacts operate and at contacts NR2 prepare an operate circuit for relay BA.

On the second release of relay A the earth pulse is now diverted from the vertical magnet to relay BA which operates on the left-hand winding, whereupon contacts BA1 prepare a hold circuit over the right hand winding to be completed on the subsequent operation of relay A, contacts BA2 disconnect the original operate circuit for relay DA, contacts BA4 make the retention of relay DA dependent upon the operated N1 contacts, contacts BA5 disconnect the lead to auxiliary bank private wiper AP and prepare the testing circuit for relay H to the P1 wiper.

On the second and final operation of relay A, relay W operates on the lower winding from earth over contacts H1, B1, A2, SS4, WS6, BA2 and DA1. Incidentally, relay BA is held from the same earth extended over contacts DA6, SS3 and BA1. Relay W in operating holds on its middle winding over contacts W2 to earth at contacts B3 and like the holding circuit for relay DA is dependent on contacts N1 remaining operated. The operation of relay W is purely preparatory.

During the dialled impulse train relays C and B are short circuited on the operation and release respectively of relay A and both relays are consequently made slow-to-release and remain in the operated position. On completion of the impulse train relays A and B remain operated but relay C releases slowly to function as described later.

During the so-called rectangular release of the wipers, the rotary off-normal contacts restore when the wipers reach the end of the level, and on completion of the release operation the vertical off-normal contacts restore to release relay DA and W at contacts N1. Relay BA, however, remains operated on the right hand winding from earth over contacts B4, DA6, SS3 and BA1, to prevent further digit absorption and to maintain the H relay switching circuit in a state of preparedness.

When the tens digit is dialled relay A responds and relay C operates for the duration of the train as before. The complete impulse train is steered to the vertical magnet and the wipers are raised to the corresponding level. It will be noted that the NPA contacts are ineffectual since they are disconnected at contacts BA2. The vertical off-normal contacts again operate, so that on the release of relay C, after completion of the impulse train, relay E operates from earth over contacts B3, DA5, NR1, N3, SS1 and C1. Relay E in operating, at contacts E2 prepares a circuit to the switching relay H, at contacts E3 prepares a holding circuit for itself, at contacts E4 opens a point in the circuit of the middle winding of relay A, and at contacts E5 transfers the impulsing lead from the vertical magnet to the rotary magnet.

When the third digit is dialled relay A responds and again relay C operates. The impulses are now directed to the rotary magnet RM and the wipers are advanced to the corresponding set of contacts in the bank. On the first rotary step the rotary off-normal contacts again operate and at contacts NR1 open the original operate circuit for relay E which now holds from earth over contacts B4, E3 and C1, and at contacts NR3 prepare a circuit to common lead 11 extending to busy tone earth.

When relay A is steadily energised, after completion of dialling, relay C again releases slowly, due to the short circuit at contacts A1, whereupon the circuit of the slow-to-release relay E is disconnected at contacts C1, and the testing circuit for relay H to the private conductor of the required line is completed for the release time of relay E, viz. earth over contacts B3, DA5, C4, E2, both windings of relay H, contacts BA5 and WS3 and the P1 wiper.

One of two conditions may now apply. The required line may be idle as indicated by the presence of a resistance battery potential on the P1 bank contact or the line may be busy as indicated by an earth potential.

If the line is idle relay H operates during the release time of relay E, and at contacts H1 prepares a hold circuit for relay F, at contacts H4 and H7 closes points in the conductors to the wanted party's line, at contacts H6 applies guarding earth via the low resistance right hand winding of relay H to the P1 bank contact, and at the same time provides a holding circuit for itself on the same winding. Relay E subsequently releases and at contacts E2 disconnects the H relay testing circuit, at contacts E4 connects ring tone earth extending over common lead 10 and operated contacts H5 to the middle winding of relay A thereby making the tone audible to the calling party, and at contacts E7 connects up ringing current by way of common lead 16 and the upper winding of the ring-trip relay F to the −1 conductor, the ringing return being by way of the +1 conductor and resistor YA to battery.

The called party's bell is now rung, and when he answers relay F operates its lightly adjusted contacts F4 thereby enabling the relay to operate fully and lock on the lower winding. Relay F in operating, at contacts F1 and F5 disconnects the ringing current and diverts the wanted party's speaking loop over contacts F2 and F6 to relay D which operates and completes the speech transmission bridge, at contacts F3 prepares the supervisory circuit, and at contacts F7 disconnects ring tone earth. Relay D in operating, at contacts D2 short circuits contacts BA5 to give the last party release facility, and at contacts D6 disconnects the supervisory circuit. The connection has now been fully set up and the parties may converse.

If the wanted line is engaged when the testing circuit for relay H is completed, the relay does not operate, due to the earth potential picked up by the P1 wiper, and upon the subsequent release of relay E busy tone earth is connected to middle winding of relay A to transmit the tone to the calling party.

Consider now the case of a calling party requiring connection to another party in the 2nd hundred line group, in which case the prefix digit "3" is dialled. The sequence, including release of the wipers over level 1, is the same as the 1st hundred line group call, up to the second "make" of the dial when relay W operates and locks and at contacts W1 prepares an operate circuit for relay WS, at contacts W3 and W4 prepares operate circuits for relays SS and E respectively. Upon the third "break," the wiper switching relay WS operates on the upper winding and first holds on the subsequent make pulses over contacts A2 operated and the lower winding while at a later stage it holds over the lower winding from earth at contacts B4. Relay WS operating at contacts WS2 and WS5 and WS3 connects the outgoing negative, positive and private conductors respectively to the second set of wipers, and at contacts WS6 disconnects the original operate circuit for relay W and prepares to operate relay E. Upon the third and final "make" of the dial relay E operates, from earth over contacts H1, B1, A2, SS4, WS6 and W4, and remains operated from earth at contacts B4 until after the release of relay C. Relay E is purely preparatory in its function. Relays DA and W release as previously explained, but relays BA and WS however remain operated. The tens and unit digits are now dialled and the selector establishes the connection over the second set of wipers.

Referring now to the ten special service outlets accessible over the auxiliary bank AB, these outlets may be allocated to tie-line, watchman's service, or fire alarm circuits, as required, to provide facilities similar to those described in copending United States application Serial No. 607,472, now Patent No. 2,513,964, granted July 4, 1950, wherein such circuits are accessible over the final selector multiple. A method of initiating the fire alarm facility alone will be described in the present instance. The discriminating prefix digit "4" is dialled and the sequence of operations, including the release of the selector wipers over level 1, is the same as on a call to a party in the 2nd hundred group up to the third "make" of the dial, when relay E operates and holds to earth at contacts B4. Relay E operating, at contacts E5 prepares to operate relay SS. Upon the fourth "break" of the dial relay SS operates on the lower winding and first holds on the subsequent make pulses over contacts A2 operated and its upper winding while at a later stage it holds from earth over contacts B4, DA6 and SS3. Relay SS operating at contacts SS1 prepares a subsequent re-operate circuit for relay E when the wipers are returned to normal, at contacts SS2 prepares to re-operate relay W, at contacts SS3 disconnects relays BA and WS which release, at contacts SS4 prevents further digit absorption, at contacts SS5 prepares to direct the subsequent train of impulses to the vertical magnet, at contacts SS6 prevents subsequent operation of the vertical magnet when more digits than the two required are dialled and at contacts SS7 leaves relays W and DA operated dependent upon the operated N contacts. Relay BA upon releasing, at contacts BA5 transfers the incomplete testing circuit for relay H from the regular private wiper to the auxiliary bank private wiper AP. When the wipers release to normal the vertical off-normal contacts restore and at contacts N1 release relays W and DA, and at contacts N3 operate relay E from earth over contacts B3, DA5, NR1, N3, SS1 and C1. Relay E in operating, at contacts E3 completes a circuit to hold itself upon the operation of relay C, and at contacts E5 a point is closed in the vertical magnet circuit. The second digit is now dialled, whereupon relay A responds, relay C operates, and the wipers are raised to the appropriate level. Upon the release of relay C and during the release time of relay E the testing circuit for relay H is extended to the appropriate auxiliary bank private, contact SSP and relay H operates to a switching battery condition on that contact and locks over contacts H6 in the normal manner. Relay H in operating at contacts H3 prepares to connect the SSM bank contact to the M2 lead. When relay E releases, relay W re-operates from earth extended over contacts B3, DA5, C4 and E2, the upper winding of relay W, contacts SS2, BA6, DA3, N2, CR1 and the rotary magnet to battery. The rotary magnet does not operate in this circuit but relay W in re-operating, at contacts W3 ensures that further impulse transmission is ineffective, and at contacts W6 completes the connection of the M2 lead to the SSM bank contact, whereupon the associated fire alarm circuit becomes operative. The necessary alarm and calling line identity signals are consequently transmitted to the central fire station over a separate link, and the selector is forced to release.

Consideration will now be given to the priority facility which may be given to a high ranking executive whereby, upon dialing an additional digit "0," he is enabled to cut in on an established connection. Such priority subscribers are distinguished by the application of an earth potential over the M2 lead. When connection is made to an idle line the circuit functions in the same manner as on an ordinary call, and again if the selector connects with a busy line, relay H remains unoperated and busy tone is transmitted to the calling party. In the latter case the priority party may now dial the additional digit, whereupon relay C re-operates for the duration of impulsing and at contacts C2 completes a circuit to charge capacitor QA in series with resistor YD to the earth over lead M2. When relay C releases the charged capacitor is applied to relay CR which consequently operates its lightly adjusted contacts CR4, whereby relay CR is operated fully in a holding circuit to earth at B4 via D3 and E3. Relay CR operating, at contacts CR1 opens a point in the rotary magnet circuit, at contacts CR2 prepares to re-operate relay E from earth at contacts F3, and at contacts CR3 operates relay D on the upper winding from earth at contacts H1. Relay D in operating, at contacts D1 and D4 extends the speech conductors to the called party's line to complete a speech path to the established connection, at contacts D2 closes a point in the testing circuit for relay H, at contacts D3 provides an alternative holding circuit for relay CR to earth at contacts H2, at contacts D5 provides a re-operate circuit for relay E and at contacts D7 opens a point in the release control earth lead extending to lead 14. Relay E operating at contacts E2 re-establishes the relay H testing circuit. The calling priority party now instructs the established connection parties to hang up, whereupon the guarding earth on the private wiper is substituted by a battery condition to operate relay H. Relay H operating at contacts H2 releases relay CR which in turn releases relays D and E. Ring tone is now transmitted to the calling party and ringing current connected to the wanted party's line and the selector proceeds to function as in the case of an ordinary call.

The release of the selector after completion of the conversation will now be described, by way of example, as from a connection to a party in the 2nd hundred group. Relays A, B, D, F, H, BA and WS are operated on such an established connection. If the called party replaces his receiver first, relay D releases and at contacts D6 completes a circuit to the local supervisory lamp LP over lead 15 to the delayed supervisory alarm equipment, which alarm only matures if the calling party does not also replace his receiver within a specified period. Incidentally the connection may be re-established by the called party again removing his receiver. If the calling party is the first to hang up, relay A releases and at contacts A1 short circuits relay B, which is thus made slow-to-release, and operates relay C in series with resistor YC. Relay B releases at this stage and at contacts B3 operates relay E, at contacts B4 releases relays BA and WS, at contacts B5 removes guarding earth from the P conductor to release any preceding equipment, and at contacts B6 short circuits relay C which is thus made slow-to-release. Relay BA releasing, at contacts BA6 prepares a circuit to the release control lead 14, and at contacts BA7 completes the supervisory alarm circuit via lamp LP which alarm only matures if the called party fails to replace his receiver within a specified time. Relay C now releases and at contacts C3 closes a point in the self-interrupted circuit to the rotary magnet. When now the called party hangs up, relay D releases and at contacts D2 releases relay H, at contacts D5 disconnects the slow-to-release relay E, and at contacts D7 extends battery by way of the rotary magnet to the release control lead 14, whereupon a low resistance earth is returned over the release alarm earth lead 13. Relay E now releases and at contacts E1 completes the self-interrupted circuit to the rotary magnet and the wipers proceed to release to normal where the vertical off-normal contacts restore to disconnect the rotary magnet at contacts N2. Relay H releasing releases relay F which opens the supervisory circuit. If, due to a mechanical defect, the selector wipers fail to reach the normal position, then after a predetermined period the current in the release alarm earth lead 13 is reduced to prevent excessive heating of the rotary magnet.

Reference will now be made to the circuit operation in cases of dialling unallocated prefix digits. When digit "1" is dialled the wipers are raised to level 1 and the vertical off-normal and normal post contacts NPA operate followed, on the first "make" of dial, by the operation of relay DA. The wipers proceed to release to normal, but since relay BA is inoperative, relay DA remains operated on the left hand winding after the vertical off-normal contacts have released. Busy tone earth extending over common lead 11 is connected, over contacts DA2, B2, BA3, H5, F7, E4, to the middle winding of relay A and the tone is transmitted to the calling party. Further dialling is ineffective since the vertical magnet is disconnected at contacts DA4. When any digit from "5" to "0" inclusive is dialled, upon the fifth break of the dial relay DA is still operated since the switch wipers cannot have reached the normal position in the time available, thus with relay A released the upper winding of relay SS is disconnected. Relay SS releases and consequently when the switch wipers reach the normal position relay DA remains operated to connect busy tone to make further dialling ineffective.

It has been stated that the normal post contacts NPA may be set to operate on any level from 1 to 7 inclusive depending upon the numbering scheme requirements of the exchange. Now if, by way of example, a numbering scheme thus:

700–799, 1st hundred line group
800–899, 2nd hundred line group
90–99, 10 special service outlets were adopted, then the normal post contacts NPA are set to operate on level 6 which then becomes the absorption release level. Additionally a further set of normal post contacts NPB are fitted and arranged to operate on all preceding levels. If the prefix digit "6" is inadvertently dialled the selector functions as in the prior case of dialling digit 1 and busy tone is transmitted to the calling party. If however a prefix digit from "1" to "5" is dialled the NPB contacts become effective and on the release of relay C after the impulse train a circuit is completed to operate relay DA on its left hand winding from earth over contacts C5, NPB, SS7, and BA4. The wipers then release to normal over the level corresponding to the digit dialled and relay DA remains operated from earth over contacts B3, DA5, SS7 and BA4. Busy tone is transmitted to the calling party by contacts DA2.

We claim:

1. In a telephone system, a switching device for operation in a system in which switching equipment is controlled by a plurality of spaced apart series of impulses, an operating circuit and a control circuit and a releasing circuit for said device, a plurality of groups of outlets for said device, said operating circuit operated responsive to a first portion of the impulses of one series of impulses received by said device, said control circuit operated by a subsequent portion of the impulses of said one series, said releasing circuit operated during said subsequent portion, the operation of said circuits conditioning said device for connection to one of said groups of outlets responsive to at least one more series of impulses received by said device.

2. A telephone system as set forth in claim 1 in which the number of impulses in said subsequent portion determines the particular one of said groups of outlets to which said switch is connected.

3. A telephone system as set forth in claim 1 in which the number of impulses of said subsequent portion determines the number of series of impulses required to connect said device to one of said groups of outlets.

4. In a telephone system, an automatic switch, a plurality of groups of outlets for said switch, said switch adapted to be set on to an outlet of a particular one of said groups in response to at least two spaced apart trains of impulses, control apparatus and a releasing circuit for said switch, said switch operated in response to one portion of the impulses of a first train of impulses delivered thereto, said releasing circuit operated under control of said operated switch during another portion of the impulses of the first train, said control apparatus operated by the other portion of the impulses and under control of means operated by said releasing circuit to select one of said groups of outlets, and said switch operated by at least one more train of impulses to set itself on to an outlet of a selected one of said groups.

5. A telephone system as set forth in claim 4 in which said control apparatus comprises a group of relays for registering the number of impulses in said other portion.

6. A two motion digit absorbing switch having access to a plurality of groups of lines and adapted to respond to a plurality of received trains of impulses to select any line in said plurality of groups of lines, means for operating said switch responsive to a first train of impulses, said switch being operated to the same extent regardless of the number of impulses in the first train, control apparatus in said switch, means operated in accordance with the number of impulses in said first train for operating said controlling apparatus for preparing said switch to select any particular one of the groups of lines, the means in said switch operated in response to subsequent received impulses to select said particular group of lines.

7. In a telephone system, an automatic switch capable of operation by a plurality of series of impulses and having two rectilinear motions, a plurality of sets of wipers for said switch, means in the switch operated responsive to the reception of the impulses of one series to operate the switch in one of its motions and then automatically release the same, means operated dependent on the number of impulses in said first received series for determining which set of wipers is to be effective, means operated responsive to a second series of impulses to again move the switch in said one of its motions to extend a connection over one of said wiper sets if said one set has been made effective and operated in response to both a second and a third series of impulses to extend a connection over one of the other wiper sets if any of the other wiper sets have been made effective.

8. In a telephone system, a plurality of groups of lines, a switch for establishing a talking connection to any one of said lines regardless of whether said line is idle or busy, an impulse receiving circuit and a group of relays for said switch, a set of wipers individual to each of said groups of lines, said impulsing circuit operated by a first train of impulses for first operating said switch in accordance with a fixed number of the impulses of the first train and then for operating said group of relays in accordance with the rest of the impulses of the first train, the operation of said relays being effective to select a wiper set individual to one of said groups of lines, said impulsing circuit operated by subsequent trains of impulses for operating said switch to associate a selected wiper set with a particular line in the corresponding group of lines, and means for establishing a talking circuit to said particular line in case it is busy, said impulsing circuit operated by a further train of impulses to control said means.

9. For use in a telephone system, a two motion switch adapted to respond to a plurality of trains of received impulses to select a particular line in a particular group of the lines accessible thereto, a plurality of wiper sets having access to the groups of lines respectively, means in the switch operated in response to a first impulse of a first received train of impulses to move the switch in a first motion and release it to normal, and responsive to the remaining impulses of said train to select a wiper set, the wiper set selected depending on the number of impulses in the train, and said means thereafter operated in response to either a single train of impulses to select a line when one wiper set is selected, or to two subsequent trains of impulses when another set is selected.

10. A switch such as set forth in claim 9 in which said means includes a group of relays operated by impulses received by the switch to select a wiper set.

ERIC WYN JONES.
OWEN AVIS PEARCE.

REFERENCES CITED

The following references are of record in the file of this patent:

UNITED STATES PATENTS

| Number | Name | Date |
|---|---|---|
| 2,170,885 | Wright | Aug. 29, 1939 |
| 2,211,443 | Stehlik | Aug. 13, 1940 |
| 2,222,126 | Taylor | Nov. 19, 1940 |
| 2,236,808 | Taylor | Apr. 1, 1941 |

FOREIGN PATENTS

| Number | Country | Date |
|---|---|---|
| 478,652 | Great Britain | Jan. 21, 1938 |